United States Patent
Miyazawa et al.

(10) Patent No.: US 9,354,449 B2
(45) Date of Patent: May 31, 2016

(54) IMAGE DISPLAY DEVICE AND LIQUID CRYSTAL LENS

(75) Inventors: Toshio Miyazawa, Chiba (JP); Terunori Saitou, Mobara (JP); Tatsuya Sugita, Takahagi (JP); Miyuki Sugita, legal representative, Takahagi (JP); Shinichiro Oka, Hitachi (JP)

(73) Assignee: JAPAN DISPLAY INC., Tokyo (JP)

( * ) Notice: Subject to any disclaimer, the term of this patent is extended or adjusted under 35 U.S.C. 154(b) by 653 days.

(21) Appl. No.: 13/473,671

(22) Filed: May 17, 2012

(65) Prior Publication Data

US 2012/0293503 A1    Nov. 22, 2012

(30) Foreign Application Priority Data

May 20, 2011  (JP) ................. 2011-113960

(51) Int. Cl.
  *G02F 1/1335* (2006.01)
  *G02B 27/22* (2006.01)
  *H04N 13/04* (2006.01)
  *G02F 1/29* (2006.01)

(52) U.S. Cl.
  CPC .............. *G02B 27/2214* (2013.01); *G02F 1/29* (2013.01); *H04N 13/0404* (2013.01); *H04N 13/0454* (2013.01); *G02F 1/133526* (2013.01); *G02F 2001/294* (2013.01)

(58) Field of Classification Search
  CPC ... G02F 27/2214; G02F 1/29; H04N 13/0404; H04N 13/0454
  See application file for complete search history.

(56) References Cited

U.S. PATENT DOCUMENTS

| | | | |
|---|---|---|---|
| 5,493,427 A | 2/1996 | Nomura et al. | |
| 7,532,272 B2* | 5/2009 | Woodgate et al. | 349/95 |
| 2008/0211977 A1 | 9/2008 | Ijzerman et al. | |
| 2010/0238276 A1* | 9/2010 | Takagi et al. | 348/54 |
| 2011/0084963 A1* | 4/2011 | Im | 345/419 |
| 2011/0292306 A1* | 12/2011 | Kim et al. | 349/5 |

FOREIGN PATENT DOCUMENTS

| | | |
|---|---|---|
| CN | 101097308 A | 1/2008 |
| JP | 7-72445 | 3/1995 |
| JP | 7-77748 | 3/1995 |

(Continued)

OTHER PUBLICATIONS

Partial tnglish translation of office action issued in corresponding foreign Chinese Patent Application No. 201210164548.0, mailed May 26, 2014.

(Continued)

*Primary Examiner* — James Dudek
(74) *Attorney, Agent, or Firm* — Typha IP LLC

(57) ABSTRACT

An image display device includes: a display panel having a plurality of pixels disposed in a matrix; and a liquid crystal lens disposed on the side of a display surface of the display panel, wherein the pixels of the display panel are divided into a plurality of pixel groups each including two or more pixels, the liquid crystal lens forms, by application of an electric field, a lens array having a plurality of lens portions each corresponding to each of the pixel groups, the lens portion is configured to have a first area having a constant refractive index and a second area having a distribution of refractive index, the second area is disposed at a side portion of the lens portion, and the first area is disposed closer to the center than the second area.

13 Claims, 7 Drawing Sheets

(56) References Cited

FOREIGN PATENT DOCUMENTS

| | | |
|---|---|---|
| JP | 2002-214579 | 7/2002 |
| JP | 2003-066405 | 3/2003 |
| JP | 2004-258631 | 9/2004 |
| JP | 2008-009370 | 1/2008 |
| JP | 2009-511942 | 3/2009 |
| WO | WO 2011/036736 | 3/2011 |

OTHER PUBLICATIONS

Partial English translation of office action issued in corresponding Japanese Patent Application No. 2011-113960, mailed Jul. 1, 2014.
Partial English translation of Office Action issued in connection with corresponding Japanese patent Application No. 2011-113960, mailed Sep. 24, 2014.
Office Action dated on Feb. 3, 2015 regarding a counterpart Chinese patent application No. 201210164548.0.

* cited by examiner

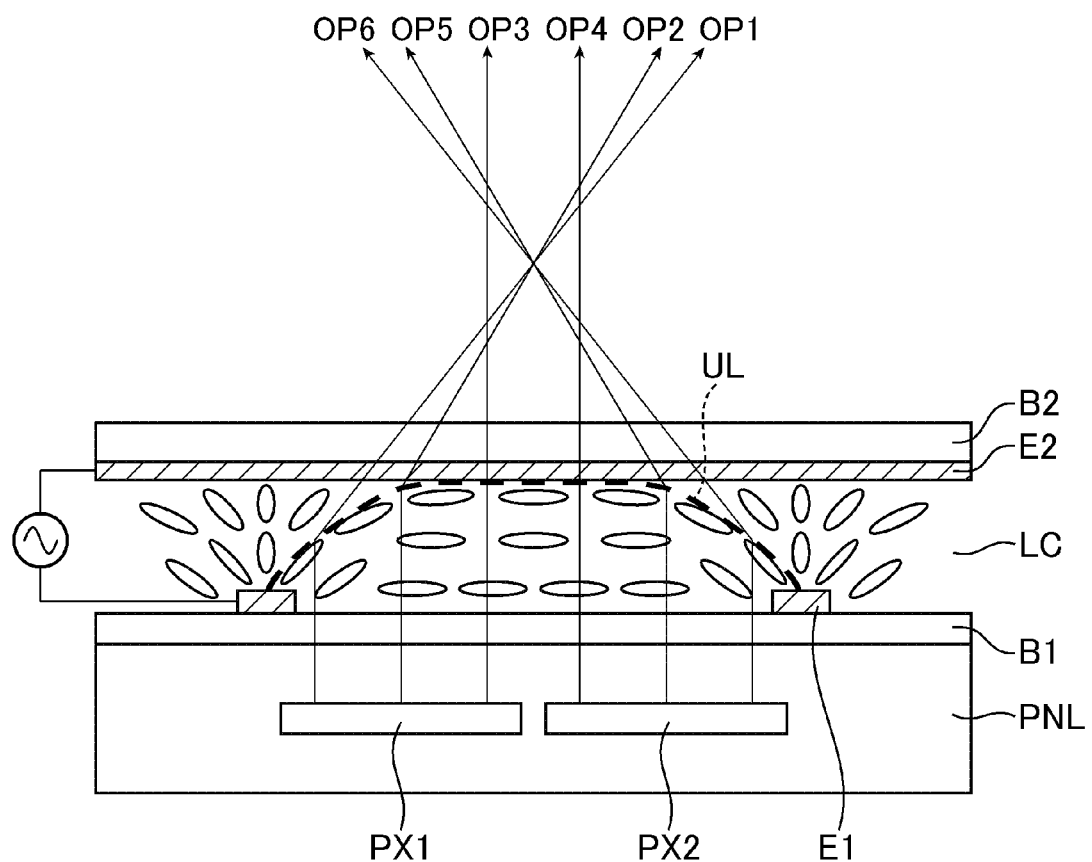

IMAGE DISPLAY DEVICE AND LIQUID CRYSTAL LENS

CROSS-REFERENCE TO RELATED APPLICATION

The present application claims priority from Japanese application JP2011-113960 filed on May 20, 2011, the content of which is hereby incorporated by reference into this application.

BACKGROUND OF THE INVENTION

1. Field of the Invention

The present invention relates to an image display device and a liquid crystal lens.

2. Description of the Related Art

Liquid crystal has fluidity like liquid, exhibits anisotropy in electrical and optical properties, and has a characteristic that its molecule alignment state can be variously controlled. Liquid crystal lenses having liquid crystal with such properties sealed between a pair of substrates and controlling a voltage to be applied to a liquid crystal layer to control a distribution characteristic of refractive index have been known. In JP 7-72445 A, JP 7-77748 A, and JP 2009-511942 T, image display devices including a liquid crystal lens on a viewer side (the side of a front surface or a display surface) are disclosed. For example, the image display device disclosed in JP 7-72445 A is a three-dimensional display device providing stereoscopic vision for a viewer.

FIGS. 7A and 7B explain a display principle of an image display device having a liquid crystal lens disposed at a front surface.

First in FIG. 7A, a voltage is not applied to a liquid crystal layer LC, so that the alignment of liquid crystal molecules is maintained in an initial alignment state. Therefore in FIG. 7A, the liquid crystal lens is in a state exhibiting no lens effect. In FIG. 7B, on the other hand, a voltage is applied to the liquid crystal lens, and the alignment state of liquid crystal molecules is changed by an electric field between first electrodes E1 and a second electrode E2, so that the liquid crystal lens is in a state exhibiting a lens effect.

In the case of FIG. 7B, transmitted lights from pixels of a display panel PNL are condensed by the liquid crystal lens, and travel in different directions from each other. Therefore, different images (for example, a two-dimensional image and a three-dimensional image) between the case of FIG. 7A and the case of FIG. 7B are provided for a viewer being at a predetermined position and viewing the image display device.

SUMMARY OF THE INVENTION

In an image display device including a liquid crystal lens at its front surface, an image to be displayed for a viewer can be changed by controlling the state of the liquid crystal lens.

When it is intended to obtain an ideal spherical lens shown in FIG. 7B for example, the thickness of a liquid crystal layer forming the liquid crystal lens needs to be increased to such an extent that a spherical lens can be formed. When the thickness of the liquid crystal layer is increased, the response speed (for example, the time for switching from two-dimensional image display to three-dimensional image display) of the liquid crystal lens is sometimes lowered. The lowering in the response speed of the liquid crystal lens creates stress on the viewer of the image display device.

In view of the problem described above, it is an object of the invention to provide an image display device in which the response speed of a liquid crystal lens is improved, or to provide a liquid crystal lens whose response speed is improved. The above and other objects and novel features of the invention will be apparent from the description of the specification and the accompanying drawings.

In view of the problem described above, an image display device according to the invention includes: a display panel having a plurality of pixels disposed in a matrix; and a liquid crystal lens disposed on a viewer side (a front surface side or a display surface side) of the display panel, wherein the pixels of the display panel are divided into a plurality of pixel groups each including two or more pixels, the liquid crystal lens forms, by application of an electric field, a lens array having a plurality of lens portions each corresponding to each of the pixel groups, the lens portion is configured to have a first area having a constant refractive index and a second area having a distribution of refractive index, the second area is disposed at a side portion of the lens portion, and the first area is disposed closer to the center than the second area.

Moreover, an image display device according to the invention includes: a display panel having a plurality of pixels disposed in a matrix; and a liquid crystal lens disposed on a display surface side of the display panel, wherein the pixels of the display panel are divided into a plurality of pixel groups each including two or more pixels, the liquid crystal lens forms, by application of an electric field, a lens array having a plurality of lens portions each corresponding to each of the pixel groups, the lens portion is configured to have a first area having no lens function and a second area having a lens function, the second area is disposed at a side portion of the lens portion, and the first area is disposed closer to the center than the second area.

Moreover, in one aspect of the image display device according to the invention, the width of the first area may be 5% or more of the width of the lens portion.

Moreover, in one aspect of the image display device according to the invention, in the second area, a refractive index with respect to light (a traveling direction thereof) incident on the second area may be decreased toward the first area.

Moreover, in one aspect of the image display device according to the invention, in the second area, the amount of refraction of light incident on the second area may be decreased toward the first area.

Moreover, in one aspect of the image display device according to the invention, the liquid crystal lens may have a first substrate, a second substrate, and a liquid crystal layer interposed between the first substrate and the second substrate, and the thickness of the liquid crystal layer may be 50 micrometers or less.

Moreover, in one aspect of the image display device according to the invention, the liquid crystal lens may have a first substrate disposed on the display panel side, a second substrate disposed on the side opposite to the display panel, a plurality of first electrodes formed on the first substrate side, and a plurality of second electrodes formed on the second substrate side, the first electrode and the second electrode may be formed corresponding to each of the pixel groups, and one of the first electrode and the second electrode may be formed in an area wider than that of the other.

Moreover, in one aspect of the image display device according to the invention, the image display device may further include a display switching unit switching between display of a two-dimensional image and display of a three-dimensional image, wherein at the time of displaying the two-dimensional image, in the liquid crystal lens, the alignment of liquid crystal molecules is aligned in a definite direction, and at the time of displaying the three-dimensional image, the liquid crystal lens forms the lens array having the plurality of lens portions, in which the alignment of liquid crystal molecules at the time of displaying the two-dimensional image is maintained in the first area of the lens portion and the alignment of liquid crystal molecules is changed from the definite direction in the second area of the lens portion.

Moreover, in one aspect of the image display device according to the invention, the image display device may further include a display switching unit switching between display of a two-dimensional image and display of a three-dimensional image, wherein a time for switching the display between the two-dimensional image and the three-dimensional image by the display switching unit may be within one second.

Moreover, in one aspect of the image display device according to the invention, the liquid crystal lens may have a first substrate, a second substrate, and a liquid crystal layer interposed between the first substrate and the second substrate, and the thickness of the liquid crystal layer may be smaller than the pitch of the pixel.

Moreover, an image display device according to the invention includes: a display panel having a plurality of pixels disposed in a matrix; and a stereoscopic image output unit outputting a stereoscopic image based on a display on the display panel for a viewer viewing from a predetermined position, wherein the pixels of the display panel are divided into a plurality of pixel groups each including two or more pixels, each of the plurality of pixel groups includes a pixel for displaying for the right eye and a pixel for displaying for the left eye for the viewer, a portion, in the stereoscopic image output unit, corresponding to each of the pixel groups is configured to have a first area having no lens function and a second area having a lens function, the second area is disposed at a side portion of the portion corresponding to each of the pixel groups, and the first area is disposed closer to the center than the second area. Moreover, the second area may refract transmitted light from the display panel so that the display for the right eye is input to the right eye of the viewer, or refract transmitted light from the display panel so that the display for the left eye is input to the left eye of the viewer.

Moreover, a liquid crystal lens according to the invention is a liquid crystal lens which forms a lens array by the application of an electric field, the lens array including a plurality of lens portions, wherein the lens portion is configured to have a first area having no lens function and a second area having a lens function, the second area is disposed at a side portion of the lens portion, and the first area is disposed closer to the center than the second area.

According to the invention, it is possible to provide an image display device in which the response speed of a liquid crystal lens is improved. Moreover, according to the invention, it is possible to provide a liquid crystal lens whose response speed is improved.

BRIEF DESCRIPTION OF THE DRAWINGS

FIG. 3B schematically shows a cross section of the image display device of the first embodiment.

DETAILED DESCRIPTION OF THE INVENTION

Hereinafter, embodiments of the invention will be described with reference to the drawings.

First Embodiment

Figure 1:
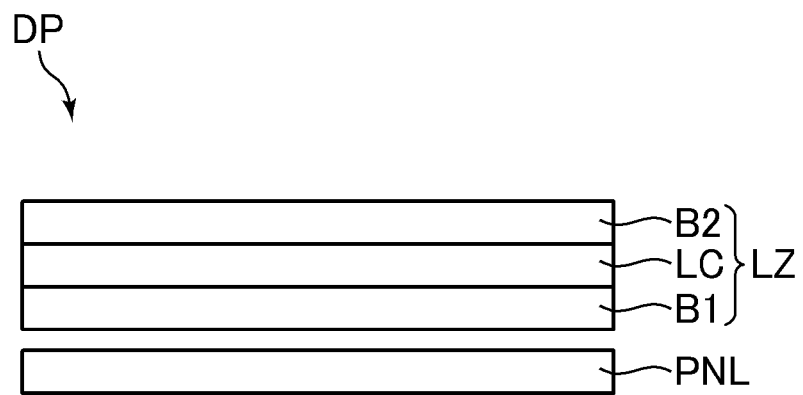
FIG. 1 is a schematic view schematically showing an image display device according to a first embodiment of the invention.

FIG. 1 is a schematic view of an image display device DP according to a first embodiment of the invention. The image display device DP is configured to include a display panel PNL and a liquid crystal lens LZ disposed on a viewer side (a front surface side or a display surface side) of the display panel PNL. Moreover, the image display device DP in the first embodiment has a function of switching between display of a three-dimensional image and display of a two-dimensional image.

The display panel PNL is configured to have a plurality of pixels disposed in a matrix. The plurality of pixels are further divided into a plurality of pixel groups each configured to include two or more pixels. The pixel groups of the embodiment are defined so as to be adjacent to one another in a display area where the plurality of pixels are arranged in a matrix. Each of the pixel groups has a pixel which outputs display for the right eye and a pixel which outputs display for the left eye in three-dimensional display.

The liquid crystal lens LZ is configured to include a first substrate B1, a second substrate B2, and a liquid crystal layer LC interposed therebetween. The liquid crystal lens LZ forms a lens array when an electric field is applied to the liquid crystal layer LC. The lens array is configured to include a plurality of lens portions each corresponding to each of the pixel groups of the display panel PNL. In the embodiment, three-dimensional display is provided for a viewer when an electric field is applied to the liquid crystal layer LC, while two-dimensional display is provided in a state where no electric field is applied.

Figure 2:
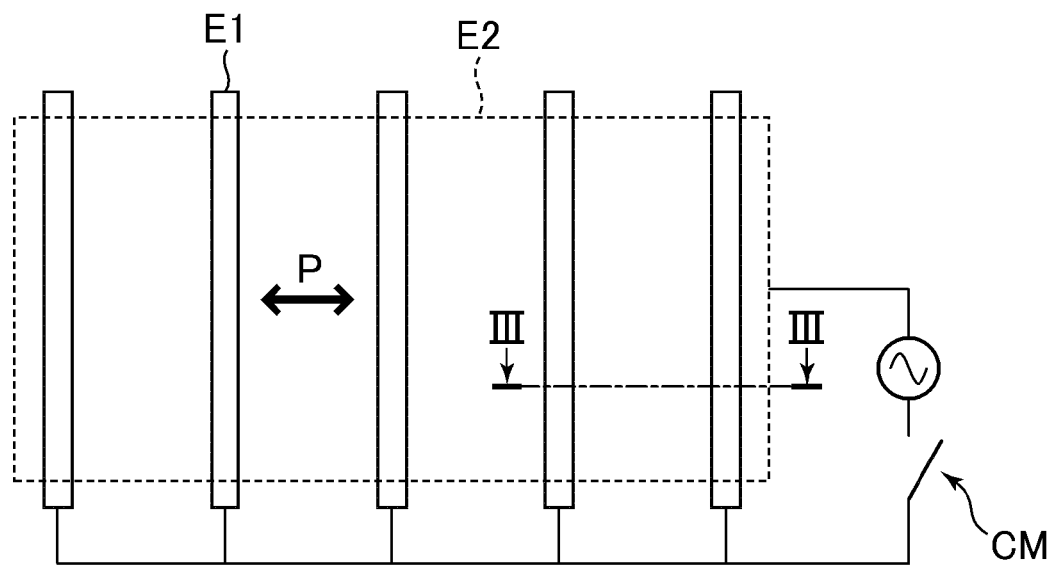
FIG. 2 schematically shows an electrode structure of a liquid crystal lens of the first embodiment.

FIG. 2 is a schematic view of an electrode structure, in plan view, in the liquid crystal lens LZ of the embodiment, in which it is supposed that the image display device DP is viewed from the viewer side. A first electrode E1, which is formed in a strip form on the first substrate B1 at a plurality of places, extends in the up-and-down direction as viewed from the viewer. A second electrode E2, which is formed in one flat plate shape, is common to the pixel groups. Since the liquid crystal lens LZ has to allow light to transmit therethrough, at least the second electrode E2 is formed of a transparent metal such as ITO.

An alignment film (not shown) is formed on interfaces of the first substrate B1 and the second substrate B2 on the side of the liquid crystal layer LC. The double-headed arrow P in FIG. 2 indicates a rubbing direction of the alignment film in the first substrate B1 and the second substrate B2. Accordingly, in an initial alignment state where no voltage is applied, liquid crystal molecules are aligned parallel to a main surface of the first substrate B1, in which the long-axis direction of the liquid crystal molecule is aligned with the direction of the double-headed arrow P.

Moreover, a display switching unit CM is connected between the first electrodes E1 and the second electrode E2 with a wire. The display switching unit CM is switched between an ON state and an OFF state by external input. In the ON state, a voltage is input between the first electrodes E1 and the second electrode E2 to control the alignment of the liquid crystal layer LC. The applied voltage in the ON state is an AC voltage for preventing degradation of liquid crystal.

Figure 3A:
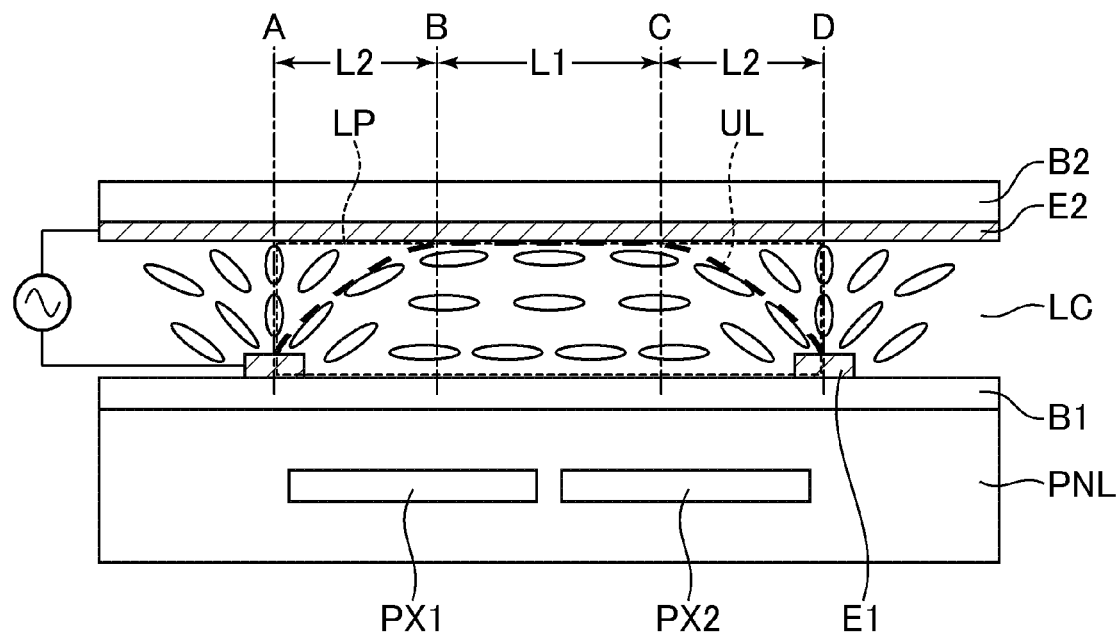
FIG. 3A schematically shows a cross section of the image display device of the first embodiment.

FIG. 3A shows a cross section corresponding to that at a position of III-III in FIG. 2, the cross section being in the horizontal direction as viewed from the viewer of the image display device DP. FIG. 3A shows a cross section of one lens portion LP corresponding to one pixel group in the display panel PNL. FIG. 3B explains transmitted lights from the lens portion LP in FIG. 3A.

Particularly, as shown in FIG. 3A, the lens portion LP is configured to have a first area L1 and second areas L2. The first area L1 has a constant refractive index with respect to a polarization direction of passing light. The second area L2 does not have a constant refractive index but has a distribution of refractive index with respect to a polarization direction of passing light.

First, in the first area L1, the alignment of liquid crystal molecules is aligned to be in its initial alignment direction, so that the first area L1 shows a spatially constant refractive index between the two substrates and does not exhibit a lens function. That is, the first area L1 serves as an optically uniform medium with respect to transmitted lights from the pixels from the display panel PNL. As shown by a light beam OP3 and a light beam OP4 of FIG. 3B, an image from the display panel PNL is not subjected to optical modulation and output as it is without refraction of the traveling direction of light. In the second area L2, on the other hand, the alignment of liquid crystal molecules is changed between the two substrates, so that the second area L2 has a lens function. As shown in FIG. 3A, the liquid crystal molecules in the second area L2 are changed from a state where the long axis of the liquid crystal molecule is aligned in the vertical direction to an alignment where the liquid crystal molecules spread in a radial fashion so as to gradually fall down with distance from the first electrode E1.

Moreover, as shown in FIG. 3A, the first area L1 is formed at the center of the lens portion LP, the second area L2 is formed at side portions of the lens portion LP, and the first area L1 and the second area L2 are adjacent to each other. In switching from the two-dimensional display to the three-dimensional display by the display switching unit CM, the alignment (that is, the initial alignment) of liquid crystal molecules at the time of the two-dimensional display is maintained in the first area L1, while in the second area L2 formed outside of the first area L1, the alignment of liquid crystal molecules is changed from the initial alignment state according to an applied electric field and the distribution of refractive index is generated, whereby the traveling direction of light incident on the second area L2 is refracted.

A liquid crystal molecule has a birefringent property, so that a refractive index with respect to light which vibrates (has a polarization direction) in the long-axis direction of liquid crystal molecule is different from a refractive index with respect to light which vibrates (has a polarization direction) in the short-axis direction of liquid crystal molecule. In the liquid crystal lens shown in FIG. 3A, a component, in light passing through the liquid crystal molecule, whose polarization direction is the long-axis direction of liquid crystal molecule becomes extraordinary light because the long-axis direction of liquid crystal molecule has a high refractive index, while a component whose polarization direction is the short-axis direction of liquid crystal molecule becomes ordinary light because the short-axis direction of liquid crystal molecule has a low refractive index.

In FIG. 3A, the polarization direction of light incident on the liquid crystal lens, that is to say, the polarization direction of light emitted from the display panel PNL is the same direction as that of the initial alignment (that is, the direction of the double-headed arrow P in FIG. 2) of the liquid crystal molecules of the liquid crystal lens. Hence, in areas of a point A and a point D of FIG. 3A where the long axis of liquid crystal molecule is vertically aligned, most of the light incident on the liquid crystal lens is refracted by the component of the short-axis direction of liquid crystal molecule. Moreover, an area between a point B and a point C where the long axis of liquid crystal molecule is horizontally aligned (that is, the first area L1), most of the light incident on the liquid crystal lens is refracted by the component of the long-axis direction of liquid crystal molecule.

Further, in areas between the point A and the point B and between the point D and the point C where the long axis of liquid crystal molecule is aligned so as to be inclined with respect to the vertical direction (that is, the second areas L2), in the polarization direction of light incident on the liquid crystal lens, the component of the short-axis direction of liquid crystal molecule and the component of the long-axis direction of liquid crystal molecule are mixed. The ratio of the mixture varies depending on the positions of the second area L2. In other words, it can be expressed that the second area L2 has a distribution of refractive index with respect to the polarization direction of passing light. In FIG. 3A, the ratio of the component of the long-axis direction of liquid crystal molecule is increased from the point A toward the point B or from the point D toward the point C.

The dashed line in FIG. 3A schematically shows a lens interface UL formed in the lens portion LP. The lens interface UL corresponds to an interface between an area where the component of the long-axis direction of liquid crystal molecule is dominant and an area where the component of the short-axis direction of liquid crystal molecule is dominant, as for the polarization direction of light passing through the lens portion LP. Accordingly, since the long-axis direction component is dominant entirely in the first area L1, the dashed line is located in the vicinity of the second substrate B2. Moreover, since the short-axis direction component is dominant entirely at the point A and the point D of FIG. 3A, the dashed line is located in the vicinity of the first substrate B1. In the second area L2 in the embodiment, the long-axis direction component is more dominant than the short-axis direction component toward the first area L1, and a distribution of refractive index is formed with respect to the polarization direction of passing light. With this distribution, a liquid crystal lens having a function similar to that of a convex lens (that is, refracting the traveling direction of light) with respect to the traveling direction of passing light is formed. Therefore as shown in FIG. 3B, output from the second area L2 is refracted in a direction different from that of output from the first area L1 and output. Output from the second area L2 on the right side of the drawing is output mainly to the left side of the drawing. Output from the second area L2 on the left side of the drawing is output mainly to the right side of the drawing.

As has been described above, in the liquid crystal lens LZ of the embodiment, each of the lens portions LP of the lens array formed at the time of applying an electric field has the first area L1 and the second area L2 described above, and a portion where the distribution of refractive index with respect to the polarization direction of light is generated (that is, the second area L2) is generated at limited portions of the lens portion LP. Therefore, compared to a liquid crystal lens shown in FIG. 7B, an area where the alignment of liquid crystal molecules changes at the time of applying an electric field is decreased. Hence, the response speed of the liquid crystal lens is enhanced. Moreover, compared to the liquid crystal lens shown in FIG. 7B, the thickness of the liquid crystal layer LC can be decreased. This also contributes to the enhancement of the response speed of the liquid crystal lens as will be described later.

Moreover, the width of the first area L1 is at least 5% or more of the width of the lens portion LP, and preferably 10% or more, or 20% or more. The upper limit of the width of the first area L1 is preferably 60% or less, or 50% or less of the width of the lens portion LP. The term width of the first area L1 or the lens portion LP used herein means the width in a direction where the lens interface UL is formed (the length of the lens portion LP in a direction where the distribution of refractive index is generated). In the embodiment, the width means, in the lens portion LP which becomes like a cylindrical lens, the length in a cross-section direction where the lens shape is formed. Moreover, in another respect, the width of the lens portion LP corresponds to the pitch of electrode patterns formed corresponding to the pixel groups.

Next, the display of a three-dimensional image in the embodiment will be described. In the liquid crystal lens LZ, the lens portion LP which becomes like a cylindrical lens is formed between the first electrodes E1 each formed in a strip form, at a plurality of places. Accordingly, similarly to the first electrode E1, the lens portions LP extend in the up-and-down direction of the image display device DP and are arranged in parallel in the horizontal direction. Moreover, the pixel group corresponding to the lens portion LP is composed of two columns of pixels extending in the up-and-down direction, and disposed in the up-and-down direction in the order of R, G, and B. It is desirable that two pixels adjacent to each other in the horizontal direction in the pixel group have the same color.

Moreover, the pitch of each of the first electrodes E1 is different, in a strict sense, from the pitch of the pixel group (the pitch of two pixels in the embodiment), and appropriately set according to a supposed viewing location of a viewer.

In FIG. 3B, when an image for the left eye is displayed in a pixel PX1 in the left column in the drawing in the pixel group, and an image for the right eye is displayed in a pixel PX2 in the right column in the drawing, the image for the left eye is output to the left eye of a viewer, and the image for the right eye is output to the right eye of the viewer, whereby stereoscopic vision is provided for the viewer. On the other hand, the light beam OP3 and the light beam OP4 incident on the first area L1 go straight without changing their traveling directions. However, the section of the first area L1 is spatially limited, so that a stereoscopic effect can be generated by an effect similar to the case of a parallax barrier system. Therefore, even with the liquid crystal lens LZ which forms the lens array as in the embodiment (that is, even with the liquid crystal lens LZ including the first area L1 having no convex lens function), a stereoscopic image is provided for the viewer.

Figure 4:
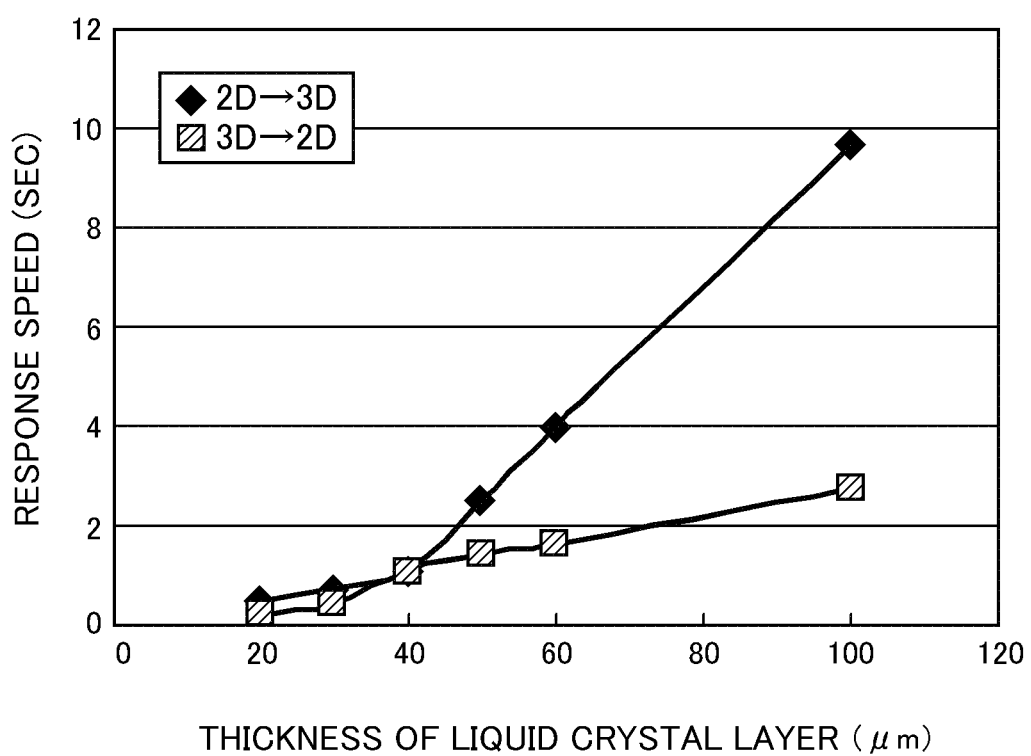
FIG. 4 is a graph showing a relation between the thickness and the response speed of a liquid crystal layer of the liquid crystal lens.

FIG. 4 is a graph showing a relation between the thickness and the response speed of the liquid crystal layer LC of the liquid crystal lens. FIG. 4 shows the response speed of the liquid crystal lens LZ when changing from two-dimensional display to three-dimensional display (2D→3D) and the response speed of the liquid crystal lens LZ when changing from three-dimensional display to two-dimensional display (3D→2D). As shown in FIG. 4, as the thickness of the liquid crystal layer LC is decreased, the response speed becomes high. The response speed (sec) shown in FIG. 4 means a time from when a predetermined voltage is applied to the first electrodes E1 and the second electrode E2 for changing between the two-dimensional display and the three-dimensional display until the liquid crystal lens forms a lens array (or until the lens array formed by the liquid crystal lens is dissolved).

The display panel PNL of the embodiment has a resolution of 300 ppi, in which the size of each of the pixel PX1 and the pixel PX2 is substantially 85 μm and the width of the pixel group or the width of the lens portion LP is substantially 170 μm (that is, about twice the size of the pixel). In this case, when it is intended to obtain an ideal arc-like lens interface shape shown in FIG. 7B, the thickness of the liquid crystal layer LC needs to be at least about the size of the pixel. In the embodiment, however, the thickness of the liquid crystal layer LC is 50 μm (that is, the thickness smaller than the size of the pixel (for example, in the short-side direction or the horizontal direction) or the pitch of the pixel (for example, in the short-side direction or the horizontal direction)), whereby the switching time (that is, the response speed) between the two-dimensional display and the three-dimensional display is improved.

As described above, in the image display device of the embodiment, the thickness of the liquid crystal layer LC is decreased to thereby form the liquid crystal lens LZ having the structure shown in FIG. 3A and FIG. 3B, so that the response speed of the liquid crystal lens LZ is improved and a stereoscopic image is provided for a viewer at a predetermined position.

Moreover, in the case of decreasing the thickness of the liquid crystal layer LC to improve the response speed of the liquid crystal lens, the thickness of the liquid crystal layer LC may be 50 μm or less. However, it is more desirable that the thickness is 40 μm or less. By setting the thickness of the liquid crystal layer LC to 40 μm, the time for switching the display is about one second, and therefore, stress on a viewer is further decreased. Moreover, in a relation with the ratio between the thickness and the width of the lens portion LP, it is desirable that the thickness of the liquid crystal layer LC is one-third or less, or one-fourth or less of the width of the lens portion LP. When the thickness of the liquid crystal layer LC is 50 μm or less, it is desirable that the width of the lens portion LP is 200 μm or less.

Figure 5:
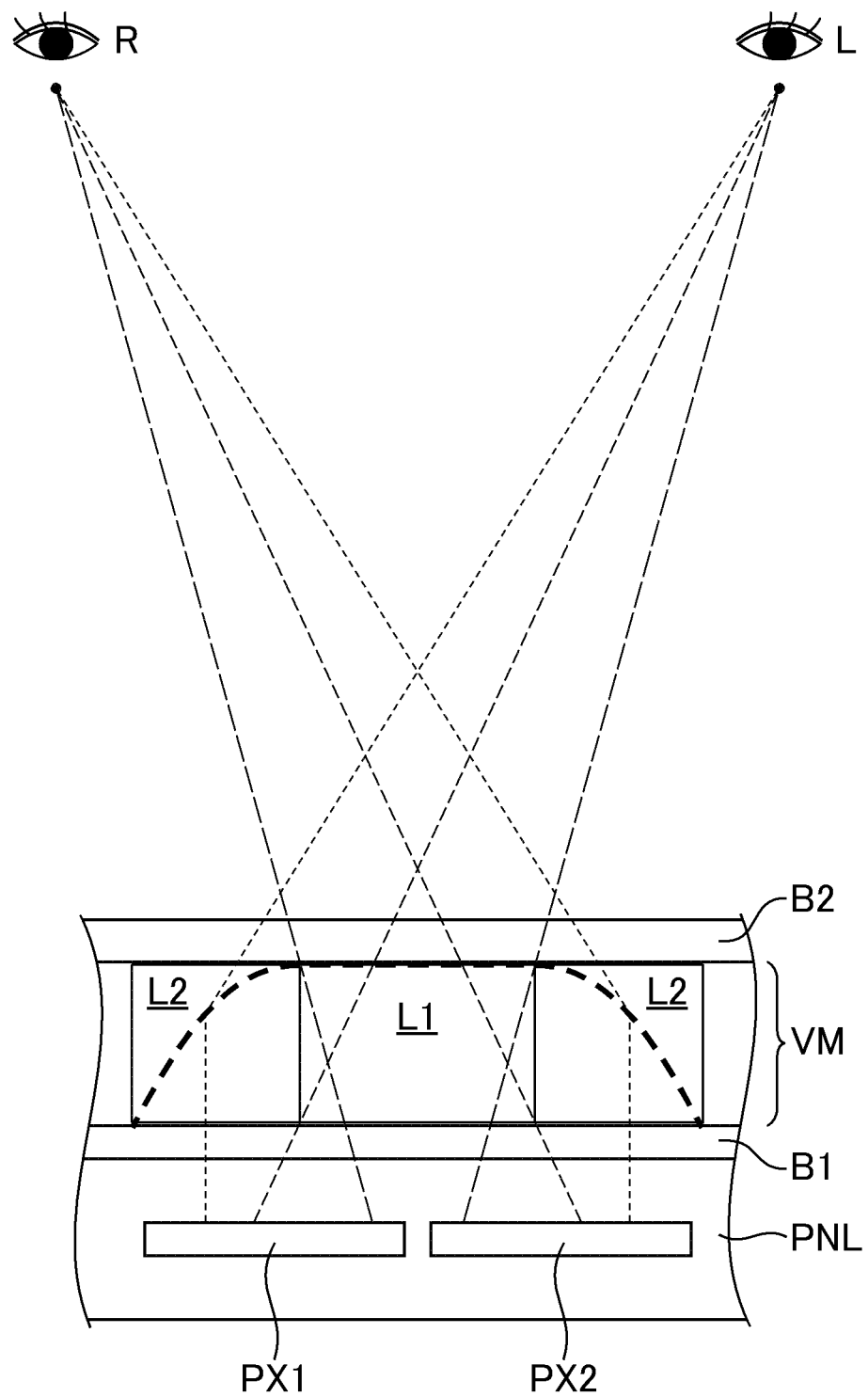
FIG. 5 schematically explains the liquid crystal lens of the first embodiment in terms of a parallax barrier system.

FIG. 5 explains the liquid crystal lens LZ of the first embodiment in terms of a parallax barrier system. As shown in FIG. 5, the liquid crystal lens LZ of the first embodiment can be grasped as a stereoscopic image output unit VM which outputs, based on output from the display panel PNL, a stereoscopic image to a viewer at a predetermined position. The stereoscopic image output unit VM has the first area L1 and the second area L2 at each of portions (pixel-group corresponding portions) corresponding to the pixel groups. The first area L1 (particularly a central portion thereof) corresponds to a slit portion of the parallax barrier system because the first area L1 does not exhibit a lens function, while the second area L2 has a function of preventing an image for the left eye (the right eye) from outputting to the right eye R (the left eye L) of the viewer. In the pixel-group corresponding portion, the first area L1 is disposed inside of the second areas L2.

In FIG. 5, when an image for the left eye is displayed in the pixel PX1, and an image for the right eye is displayed in the pixel PX2, light (one component of image display) passing through, as straight light, the first area L1 to travel from the pixel PX1 to the left eye (L), or from the pixel PX2 to the right eye (R) exists. Moreover, the traveling direction of light passing through the second area L2 is refracted, so that the image for the left eye (image for the right eye) is prevented from being introduced to the right eye R (the left eye L) of the viewer and the display for the left eye (display for the right eye) is introduced to the left eye L (the right eye R) of the viewer. In this manner, a stereoscopic image is provided for the viewer.

Second Embodiment

Next, a second embodiment of the invention will be described.

Figure 6:
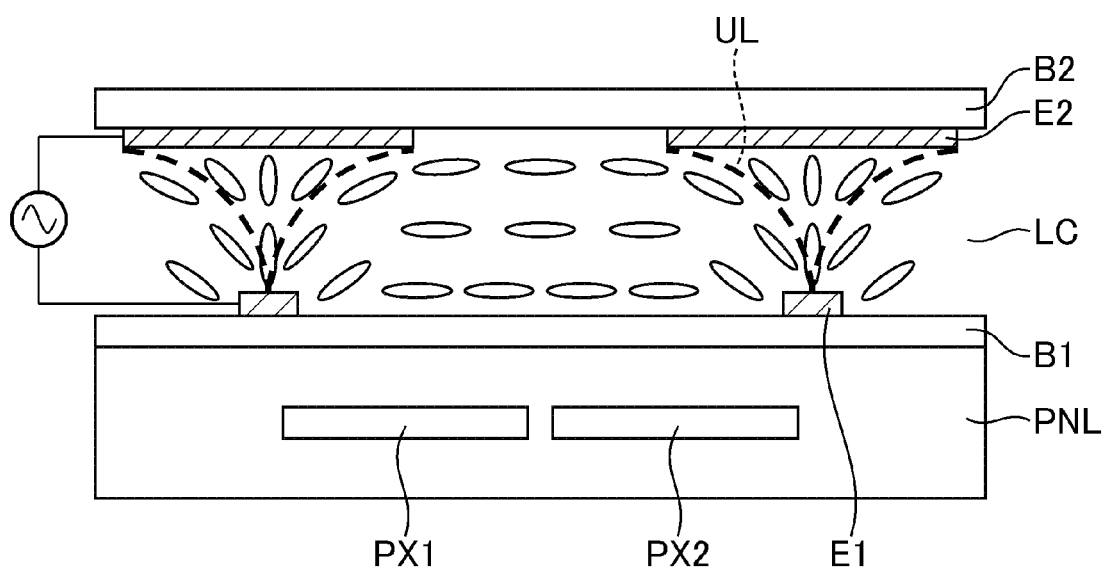
FIG. 6 schematically shows across section of an image display device of a second embodiment.

FIG. 6 shows a cross section of an image display device DP according to the second embodiment, the cross section being at a position similar to that of FIG. 3A. The first embodiment and the second embodiment are different from each other in the shape of the second electrode E2 and the thickness of the liquid crystal layer LC. In the second embodiment, the second electrode E2 is formed in a strip form.

In the embodiment, not only the first electrode E1, but also the second electrode E2 is formed corresponding to each of the pixel groups of the display panel PNL. A plurality of the second electrodes E2 are formed on the second substrate B2 spaced apart at predetermined pitches. An electric field is not applied between two second electrodes E2. Because of this configuration, a change in the alignment of liquid crystal molecules is limited to a portion of the lens portion LP, so that the response speed of the liquid crystal lens LZ is enhanced.

Moreover, the second electrode E2 is formed in an area wider than that of the first electrode E1. With such an electrode pattern, the inclination of electric lines of force can be made gentle with distance from the first electrode E1, and liquid crystal molecules can be aligned so as to spread in a radial fashion. Moreover, the distribution of refractive index to be generated in the second area L2 at the time of applying an electric field can be appropriately set by changing the electrode pattern of the first electrode E1 or the second electrode E2. Moreover, the electrode patterns of the first electrode E1 and the second electrode E2 may be exchanged with each other. The same applies to the first embodiment described above.

Figure 7A:
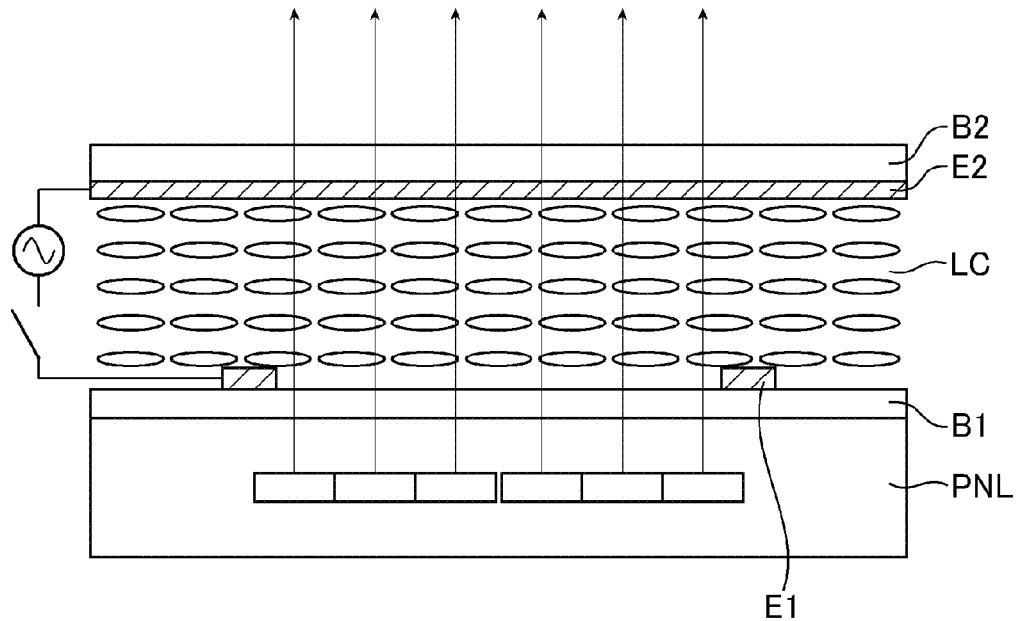
FIG. 7A schematically explains a display principle of an image display device having a liquid crystal lens.
Figure 7B:
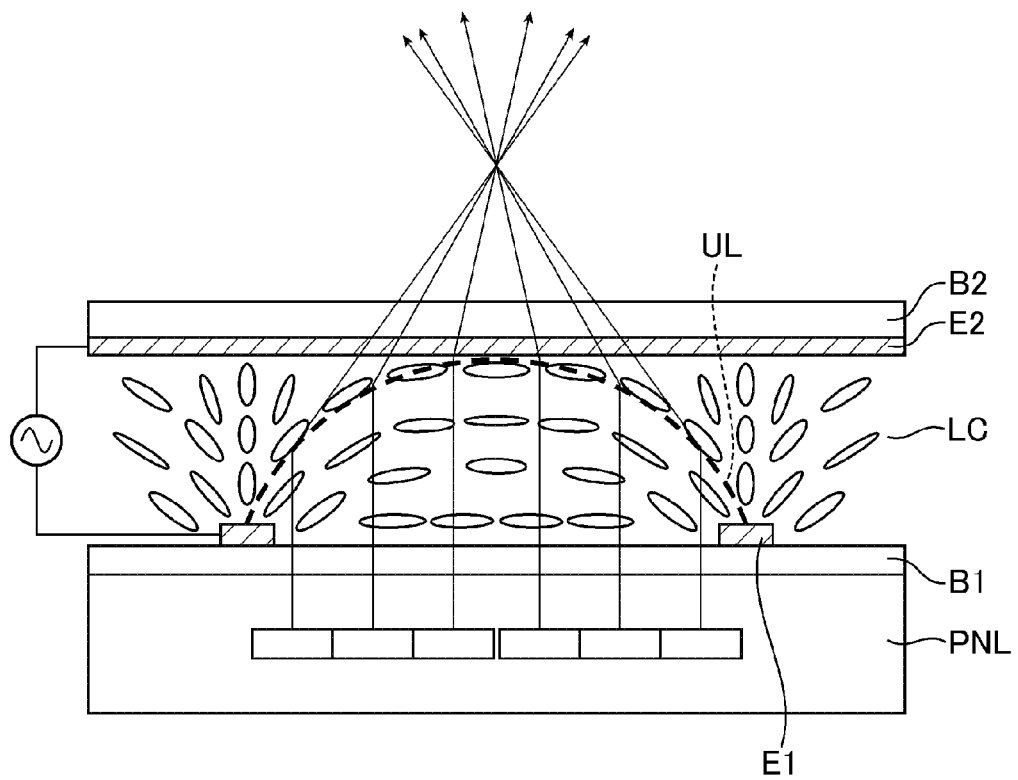
FIG. 7B schematically explains the display principle of the image display device having the liquid crystal lens.

The pixel group in each of the embodiments is composed of two columns of pixels adjacent to each other in the image display device DP. However, it is sufficient that the pixel group includes at least two pixels, and the pixel group may include many more pixels. Moreover, as shown in FIG. 7A and the like, the pixel group may be composed of two columns of pixels each including three sub-pixels.

In each of the embodiments, the cylindrical lens-like lens array which extends in the vertical direction of the image display device DP is formed. However, for example, the pixels of the display panel PNL may be divided into pixel groups each having 3×3 pixels, and the liquid crystal lens LZ may form a lens array in which the lens portions LP each corresponding to each of the pixel groups are arranged in the vertical and horizontal directions.

In the image display device DP of each of the embodiments, the display on the entire display area where an image is displayed may be switched by the liquid crystal lens LZ, or the display on a portion of the display area may be switched by the liquid crystal lens LZ.

In each of the embodiments, a liquid crystal display panel may be used for the display panel PNL, or an organic EL display panel may be used. In the case of using a liquid crystal display panel, a backlight is further disposed at a rear surface of the display panel PNL.

The invention is not limited to the embodiments described above but can be modified variously. For example, the configuration described in each of the embodiments can be replaced with substantially the same configuration, a configuration providing the same operational effect, or a configuration capable of achieving the same object.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An image display device comprising:
a display panel having a plurality of pixels disposed in a matrix; and
a liquid crystal lens disposed on a display surface side of the display panel, wherein
the pixels of the display panel are divided into a plurality of pixel groups each including two or more pixels,
the liquid crystal lens forms, by application of an electric field, a lens array having a plurality of lens portions each corresponding to each of the pixel groups,
the lens portion is configured to have a first area having a constant refractive index and a second area having a distribution of refractive index,
the second area is disposed at a side portion of the lens portion,
the first area is disposed closer to the center than the second area,
the liquid crystal lens has a first substrate, a plurality of first electrodes formed on the first substrate, a second substrate, a plurality of second electrodes formed on the second substrate, and a liquid crystal layer interposed between the first substrate and the second substrate,
the plurality of the first electrodes extend parallel to each other, with a first space next to each other, the first space overlapping with the first area,
the plurality of the second electrodes extend in the same direction as the plurality of the first electrodes, parallel to each other, with a second space next to each other, the second space overlapping with the first area,
each of the plurality of the second electrodes is wider than each of the plurality of the first electrodes,
the thickness of the liquid crystal layer is 50 micrometers or less, and
interfaces of the liquid crystal layer near a surface side of the first substrate and near a surface side of the second substrate are formed in a substantially planer shape.

2. An image display device comprising:
a display panel having a plurality of pixels disposed in a matrix; and
a liquid crystal lens disposed on a display surface side of the display panel, wherein
the pixels of the display panel are divided into a plurality of pixel groups each including two or more pixels,
the liquid crystal lens forms, by application of an electric field, a lens array having a plurality of lens portions each corresponding to each of the pixel groups,
the lens portion is configured to have a first area having no lens function and a second area having a lens function, the second area is disposed at a side portion of the lens portion, the first area is disposed closer to the center than the second area, the liquid crystal lens has a first substrate, a plurality of first electrodes formed on the first substrate, a second substrate, a plurality of second electrodes formed on the second substrate, and a liquid crystal layer interposed between the first substrate and the second substrate, the plurality of the first electrodes extend parallel to each other, with a first space next to each other, the first space overlapping with the first area, the plurality of the second electrodes extend in the same direction as the plurality of the first electrodes, parallel to each other, with a second space next to each other, the second space overlapping with the first area, each of the plurality of the second electrodes is wider than each of the plurality of the first electrodes, the thickness of the liquid crystal layer is 50 micrometers or less, and interfaces of the liquid crystal layer near a surface side of the first substrate and near a surface side of the second substrate are formed in a substantially planer shape.

3. The image display device according to claim 1, wherein the width of the first area is 5% or more of the width of the lens portion.

4. The image display device according to claim 1, wherein in the second area, a refractive index with respect to light incident on the second area is decreased toward the first area.

5. The image display device according to claim 1, wherein in the second area, the amount of refraction of light incident on the second area is decreased toward the first area.

6. The image display device according to claim 1, further comprising a display switching unit switching between display of a two-dimensional image and display of a three-dimensional image, wherein at the time of displaying the two-dimensional image, in the liquid crystal lens, the alignment of liquid crystal molecules is aligned in a definite direction, and at the time of displaying the three-dimensional image, the liquid crystal lens forms the lens array having the plurality of lens portions, in which the alignment of liquid crystal molecules at the time of displaying the two-dimensional image is maintained in the first area of the lens portion and the alignment of liquid crystal molecules is changed from the definite direction in the second area of the lens portion.

7. The image display device according to claim 1, further comprising a display switching unit switching between display of a two-dimensional image and display of a three-dimensional image, wherein a time for switching the display between the two-dimensional image and the three-dimensional image by the display switching unit is within one second.

8. An image display device comprising:

a display panel having a plurality of pixels disposed in a matrix; and a liquid crystal lens disposed on a display surface side of the display panel, wherein the pixels of the display panel are divided into a plurality of pixel groups each including two or more pixels, the liquid crystal lens forms, by application of an electric field, a lens array having a plurality of lens portions each corresponding to each of the pixel groups, the lens portion is configured to have a first area having a constant refractive index and a second area having a distribution of refractive index, the second area is disposed at a side portion of the lens portion, the first area is disposed closer to the center than the second area, the liquid crystal lens has a first substrate, a plurality of first electrodes formed on the first substrate, a second substrate, a plurality of second electrodes formed on the second substrate, and a liquid crystal layer interposed between the first substrate and the second substrate, the plurality of the first electrodes extend parallel to each other, with a first space next to each other, the first space overlapping with the first area, the plurality of the second electrodes extend in the same direction as the plurality of the first electrodes, parallel to each other, with a second space next to each other, the second space overlapping with the first area, each of the plurality of the second electrodes is wider than each of the plurality of the first electrodes, the thickness of the liquid crystal layer is smaller than the pitch of the pixel, and interfaces of the liquid crystal layer near a surface side of the first substrate and near a surface side of the second substrate are formed in a substantially planer shape.

9. A liquid crystal lens which forms a lens array by application of an electric field, the lens array comprising:

a first substrate, a second substrate, a liquid crystal layer interposed between the first substrate and the second substrate, a plurality of first electrodes formed on the first substrate, a plurality of second electrodes formed on the second substrate, a plurality of lens portions, wherein the lens portion is configured to have a first area having no lens function and a second area having a lens function, the plurality of the first electrodes extend parallel to each other, with a first space next to each other, the first space overlapping with the first area, the plurality of the second electrodes extend in the same direction as the plurality of the first electrodes, parallel to each other, with a second space next to each other, the second space overlapping with the first area, each of the plurality of the second electrodes is wider than each of the plurality of the first electrodes, the second area is disposed at a side portion of the lens portion, the first area is disposed closer to the center than the second area, the thickness of the liquid crystal layer is 50 micrometers or less, and interfaces of the liquid crystal layer near a surface side of the first substrate and near a surface side of the second substrate are formed in a substantially planer shape.

10. An image display device comprising:

a display panel having a plurality of pixels disposed in a matrix; and a liquid crystal lens disposed on a display surface side of the display panel, wherein the pixels of the display panel are divided into a plurality of pixel groups each including two or more pixels, the liquid crystal lens forms, by application of an electric field, a lens array having a plurality of lens portions each corresponding to each of the pixel groups, the lens portion is configured to have a first area having no lens function and a second area having a lens function, the second area is disposed at a side portion of the lens portion, the first area is disposed closer to the center than the second area, the liquid crystal lens has a first substrate, a plurality of first electrodes formed on the first substrate, a second substrate, a plurality of second electrodes formed on the second substrate, and a liquid crystal layer interposed between the first substrate and the second substrate, the plurality of the first electrodes extend parallel to each other, with a first space next to each other, the first space overlapping with the first area, the plurality of the second electrodes extend in the same direction as the plurality of the first electrodes, parallel to each other, with a second space next to each other, the second space overlapping with the first area, each of the plurality of the second electrodes is wider than each of the plurality of the first electrodes, the thickness of the liquid crystal layer is smaller than the pitch of the pixel, and interfaces of the liquid crystal layer near a surface side of the first substrate and near a surface side of the second substrate are formed in a substantially planer shape.

11. The image display device according to claim 10, wherein the thickness of the liquid crystal layer is 50 micrometers or less.

12. The image display device according to claim 8, wherein the thickness of the liquid crystal layer is 50 micrometers or less.

13. The image display device according to claim 2, wherein the width of the first area is 5% or more of the width of the lens portion.

* * * * *